US011967288B2

(12) United States Patent
Liu

(10) Patent No.: US 11,967,288 B2
(45) Date of Patent: Apr. 23, 2024

(54) BACKLIGHT DRIVING CIRCUIT AND LIQUID CRYSTAL DISPLAY DEVICE

(71) Applicant: TCL China Star Optoelectronics Technology Co., Ltd., Shenzhen (CN)

(72) Inventor: Jinfeng Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/281,122

(22) PCT Filed: Mar. 17, 2021

(86) PCT No.: PCT/CN2021/081280
§ 371 (c)(1),
(2) Date: Mar. 29, 2021

(87) PCT Pub. No.: WO2022/188197
PCT Pub. Date: Sep. 15, 2022

(65) Prior Publication Data

US 2023/0419914 A1 Dec. 28, 2023

(30) Foreign Application Priority Data

Mar. 9, 2021 (CN) ........................ 202110256357.6

(51) Int. Cl.
*G09G 3/34* (2006.01)
*G09G 3/36* (2006.01)

(52) U.S. Cl.
CPC ......... *G09G 3/3406* (2013.01); *G09G 3/3685* (2013.01); *G09G 2320/0257* (2013.01)

(58) Field of Classification Search
CPC ............... G09G 3/3406; G09G 3/3685; G09G 2320/0257
See application file for complete search history.

(56) References Cited

U.S. PATENT DOCUMENTS

| | | | | |
|---|---|---|---|---|
| 2012/0113168 A1* | 5/2012 | Seo | G09G 3/3233 345/76 |
| 2013/0002736 A1 | 1/2013 | Park | |
| 2013/0181969 A1* | 7/2013 | Kishi | G09G 3/3233 345/212 |

(Continued)

FOREIGN PATENT DOCUMENTS

| | | |
|---|---|---|
| CN | 1797529 A | 7/2006 |
| CN | 104464618 A | 3/2015 |

(Continued)

*Primary Examiner* — Dmitriy Bolotin
(74) *Attorney, Agent, or Firm* — Menachem Nathan; Nathan & Associates

(57) ABSTRACT

The present disclosure provides a backlight driving circuit and a liquid crystal display device. The backlight driving circuit of the present disclosure adds a light emitting control module to control a light emitting device to turn on or off, thereby controlling a backlight to turn on or off, realizing a function of black insertion frame by frame of the backlight of the liquid crystal display device, satisfying a BFI function requirement. In addition, it improves product quality. In addition, the liquid crystal display device of the present disclosure lights up the backlight after a deflection of a liquid crystal layer is stabilized and displays normally, and therefore, a problem of trailing when displaying images can be decreased.

17 Claims, 6 Drawing Sheets

(56) References Cited

U.S. PATENT DOCUMENTS

| | | | | |
|---|---|---|---|---|
| 2014/0192078 | A1* | 7/2014 | Gilbert | G09G 3/3406 345/590 |
| 2015/0116379 | A1* | 4/2015 | Lim | G09G 3/342 345/691 |
| 2017/0053951 | A1* | 2/2017 | Sato | H01L 27/124 |
| 2017/0193927 | A1 | 7/2017 | Yang | |
| 2018/0108299 | A1* | 4/2018 | Nakamura | G09G 3/3233 |
| 2019/0012963 | A1* | 1/2019 | Chen | G09G 3/3233 |
| 2021/0217985 | A1* | 7/2021 | Sakai | H10K 50/813 |
| 2021/0337642 | A1* | 10/2021 | Wang | G09G 3/3426 |
| 2022/0139311 | A1* | 5/2022 | Yoo | G09G 3/3233 345/690 |
| 2023/0130697 | A1* | 4/2023 | Liu | G09G 3/3648 345/102 |

FOREIGN PATENT DOCUMENTS

| | | | |
|---|---|---|---|
| CN | 107086025 | A | 8/2017 |
| CN | 107170407 | A | 9/2017 |
| CN | 107945739 | A | 4/2018 |
| CN | 110322833 | A | 10/2019 |
| CN | 110992900 | A | 4/2020 |
| CN | 111580304 | A | 8/2020 |
| CN | 111798789 | A | 10/2020 |
| CN | 111883055 | A | 11/2020 |
| CN | 112071275 | A | 12/2020 |

* cited by examiner

BACKLIGHT DRIVING CIRCUIT AND LIQUID CRYSTAL DISPLAY DEVICE

BACKGROUND OF INVENTION

Field of Invention

The present disclosure relates to the field of display technology, specifically to a backlight driving circuit and a liquid crystal display device.

Description of Prior Art

Liquid crystal displays (LCDs) use voltage to control deflection angles of liquid crystals to control screens to display different images. However, in applications of increasingly higher refresh rates, during deflection of the liquid crystals, human eyes will perceive a problem of trailing if a backlight turns on before the deflection of the liquid crystals reach to a steady state.

In a process of research and practice of the prior art, the inventor of the present disclosure found that image quality evaluations of some display panels require the displays to support a function of black frame insertion (BFI), and require the backlight to be inserted black frames and not display images until the liquid crystals have been scanned and deflected to a steady state.

However, a backlight of active matrix mini light-emitting diode (AM mini-led) products are turned on by scanning line by line, and the backlight cannot be inserted black frames as required by the BFI, which may easily cause the trailing problem when displaying images. Therefore, there is an urgent need for a solution that can realize the AM mini-led products to insert black frames.

SUMMARY OF INVENTION

The present disclosure provides a backlight driving circuit and a liquid crystal display device, which can realize the black frame insertion of an active matrix liquid crystal display, improve display effects, and decrease the trailing problem when displaying images.

The present disclosure provides a backlight driving circuit, wherein the backlight driving circuit comprises:

A light emitting device connected in series to a light emitting loop formed by a first power signal and a second power signal;

A driving transistor, wherein a source and a drain of the driving transistor are connected in series to the light emitting loop, a gate of the driving transistor is electrically connected to a first node, and the driving transistor is configured to control a current flowing through the light emitting loop;

A data signal writing transistor, wherein a source of the data signal writing transistor is connected to a data signal, a drain of the data signal writing transistor is electrically connected to the first node, and a gate of the data signal writing transistor is connected to a scan signal;

A storage capacitor, wherein a first terminal of the storage capacitor is electrically connected to the first node, and a second terminal of the storage capacitor is connected to the second power signal; and A light emitting control module, wherein the light emitting control module is connected to an enable signal and connected in series to the light emitting loop, and the light emitting control module is configured to control the light emitting loop to be turned on or off based on the enable signal.

Alternatively, in some embodiments of the present disclosure, the light emitting control module comprises a light emitting control transistor; and A source of the light emitting control transistor is connected to the first power signal, a drain of the light emitting control transistor is electrically connected to the light emitting device, and a gate of the light emitting control transistor is connected to the enable signal.

Alternatively, in some embodiments of the present disclosure, a combination of the scan signal and the enable signal sequentially corresponds to a scan period, a display period, and a black insertion period.

Alternatively, in some embodiments of the present disclosure, during the scan period, the scan signal is at a high level, and the enable signal is at a low level.

Alternatively, in some embodiments of the present disclosure, during the display period, the scan signal is at a low level, and the enable signal is at a high level.

Alternatively, in some embodiments of the present disclosure, during the black insertion period, the scan signal is at a low level, and the enable signal is at a low level.

Alternatively, in some embodiments of the present disclosure, the data signal writing transistor, the light emitting control transistor, and the driving transistor are all low temperature polysilicon thin film transistors.

Alternatively, in some embodiments of the present disclosure, the data signal writing transistor, the light emitting control transistor, and the driving transistor are all oxide semiconductor thin film transistors.

Alternatively, in some embodiments of the present disclosure, the data signal writing transistor, the light emitting control transistor, and the driving transistor are all amorphous silicon thin film transistors.

Alternatively, in some embodiments of the present disclosure, the light emitting device is a light emitting diode, and the drain of the light emitting control transistor is electrically connected to an anode of the light emitting diode.

Correspondingly, the present disclosure further provides a liquid crystal display device, wherein the liquid crystal display device comprises a backlight module, an array substrate, a color film substrate, and a liquid crystal layer disposed between the array substrate and the color film substrate, the backlight module is disposed at a side of the array substrate away from the liquid crystal layer and provided with a backlight driving circuit comprising:

A light emitting device connected in series to a light emitting loop formed by a first power signal and a second power signal;

A driving transistor, wherein a source and a drain of the driving transistor are connected in series to the light emitting loop, a gate of the driving transistor is electrically connected to a first node, and the driving transistor is configured to control a current flowing through the light emitting loop;

A data signal writing transistor, wherein a source of the data signal writing transistor is connected to a data signal, a drain of the data signal writing transistor is electrically connected to the first node, and a gate of the data signal writing transistor is connected to a scan signal;

A storage capacitor, wherein a first terminal of the storage capacitor is electrically connected to the first node, and a second terminal of the storage capacitor is connected to the second power signal; and A light emitting control module, wherein the light emitting control module is connected to an enable signal and connected in series to the light emitting loop, and the light emitting control module is configured to control the light emitting loop to be turned on or off based on the enable signal.

Alternatively, in some embodiments of the present disclosure, a driving timing of the backlight driving circuit comprises a scan period, a display period, and a black insertion period; and during the scan period, liquid crystals in the liquid crystal layer are deflected line by line; during the display period, the deflection liquid crystal layer is stable, the backlight driving circuit drives the backlight module to emit light, and the liquid crystal display device performs normal image display; and during the black insertion period, the backlight driving circuit controls the backlight module to turn off.

Alternatively, in some embodiments of the present disclosure, during the scan period, the scan signal is at a high level, and the enable signal is at a low level.

Alternatively, in some embodiments of the present disclosure, during the display period, the scan signal is at a low level, and the enable signal is at a high level.

Alternatively, in some embodiments of the present disclosure, during the black insertion period, the scan signal is at a low level, and the enable signal is at a low level.

Alternatively, in some embodiments of the present disclosure, the light emitting control module comprises a light emitting control transistor; and A source of the light emitting control transistor is connected to the first power signal, a drain of the light emitting control transistor is electrically connected to the light emitting device, and a gate of the light emitting control transistor is connected to the enable signal.

Alternatively, in some embodiments of the present disclosure, the data signal writing transistor, the light emitting control transistor, and the driving transistor are all low temperature polysilicon thin film transistors.

Alternatively, in some embodiments of the present disclosure, the data signal writing transistor, the light emitting control transistor, and the driving transistor are all oxide semiconductor thin film transistors.

Alternatively, in some embodiments of the present disclosure, the data signal writing transistor, the light emitting control transistor, and the driving transistor are all amorphous silicon thin film transistors.

The present disclosure provides a backlight driving circuit and a liquid crystal display device. In the present disclosure, a light emitting control module is added in the backlight driving circuit on the basis of scanning the backlight line by line. The light emitting control module is configured to control the light emitting device to turn on or turn off, and therefore the backlight of the liquid crystal display device realizes black insertion frame by frame, satisfies BFI function requirement, and improves the product quality.

DESCRIPTION OF DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF PREFERRED EMBODIMENTS

Figure 1:
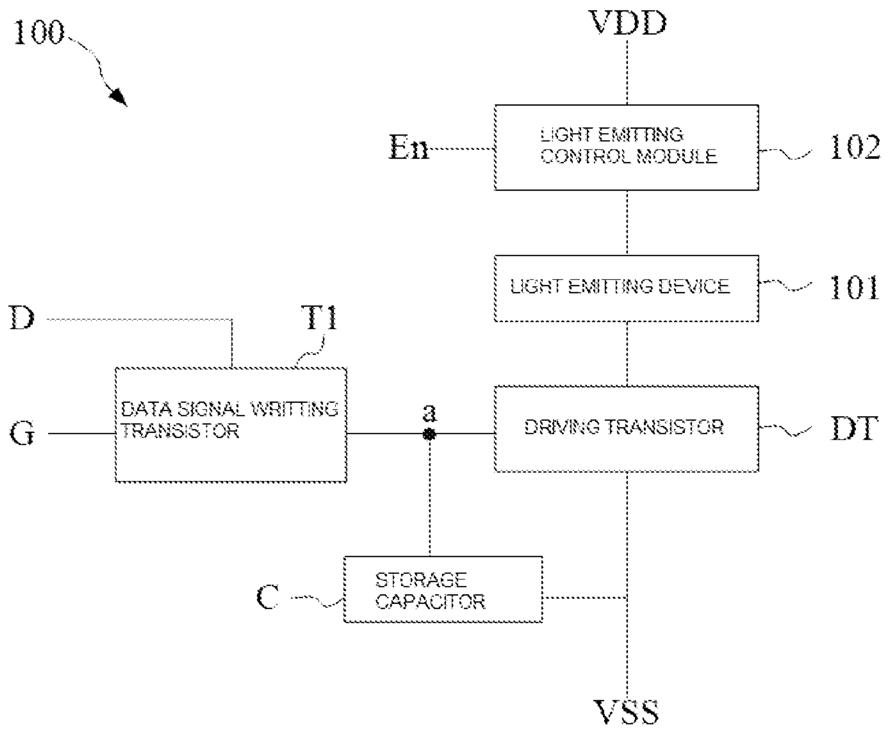
FIG. 1 is a schematic structural diagram of a backlight driving circuit provided by the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure. In addition, it should be understood that the specific implementations described here are only used to illustrate and explain the present disclosure, and are not used to limit the present disclosure. In the present disclosure, unless otherwise stated, directional words used such as "upper" and "lower" generally refer to the upper and lower directions of the device in actual use or working state, and specifically refer to the drawing directions in the drawings; and "inner" and "outer" refer to the outline of the device.

It should be noted that since sources and drains of transistors used in the present disclosure are symmetrical, the sources and drains can be interchanged. In the present disclosure, in order to distinguish two poles of a transistor other than a gate, one of the poles is called the source and the other is called the drain. In addition, the transistors used in the present disclosure may comprise P-type transistors and/or N-type transistors. Wherein, the P-type transistors are turned on when the gates are at low levels, and turned off when the gates are at high levels, and the N-type transistors are turned on when the gates are at high levels, and turned off when the gates are at low levels.

The present disclosure provides a backlight driving circuit and a liquid crystal display device. Detailed descriptions are given below. It should be noted that an order of description in the following embodiments is not meant to limit the preferred order of the embodiments.

Please refer to FIG. 1. FIG. 1 is a schematic structural diagram of a backlight driving circuit provided by the present disclosure. The present disclosure provides a backlight driving circuit 100, which comprises a light emitting device 101, a driving transistor DT, a data signal writing transistor T1, a storage capacitor C, and a light emitting control module 102.

Wherein, the light emitting device 101 is connected in series to a light emitting loop formed by a first power signal VDD and a second power signal VSS. A source and a drain of the driving transistor DT is serially connected to the light emitting loop. A gate of the driving transistor DT is electrically connected to a first node a. The driving transistor DT is configured to control a current flowing through the light emitting loop. A source of the data signal writing transistor T1 receives a data signal D. A drain of the data signal writing transistor T1 is electrically connected to the first node a. A gate of the data signal writing transistor T1 receives a scan signal G. A first terminal of the storage capacitor C is electrically connected to the first node a. A second terminal of the storage capacitor C receives the second power signal VSS. The light emitting control module 102 receives an enable signal En, and connects in series to the light emitting loop. The light emitting control module 102 is configured to control the light emitting loop to turn on or turn off based on the enable signal En.

It should be noted that the present disclosure only needs to ensure that the light emitting control module 102 and the light emitting device 101 are serially connected to the light emitting loop. The backlight driving circuit 100 shown in FIG. 1 only schematically shows special positions of the light emitting control module 102 and the light emitting device 101. That is to say, the light emitting control module 102 and the light emitting device 101 may be connected in series at any position in the light emitting loop.

Specially, the driving transistor DT is configured to control the current flowing through the light emitting loop. The data signal writing transistor T1 is configured to write the data signal D to the first node a under the control of the scan signal G. The light emitting control module 102 is configured to control the light emitting loop to turn on or turn off under the control of the enable signal En.

The backlight driving circuit 100 adopted in the present disclosure adds the light emitting control module 102 on the basis of scanning the backlight line by line. The light emitting control module 102 is configured to control the light emitting loop to turn on or turn off under the control the enable signal En, thereby controlling the light emitting device 101 to turn on or turn off. By adopting the backlight driving circuit 100 in the present disclosure, a black frame can be inserted during display, the trailing phenomenon can be decreased, and the product quality can be improved.

Figure 2:
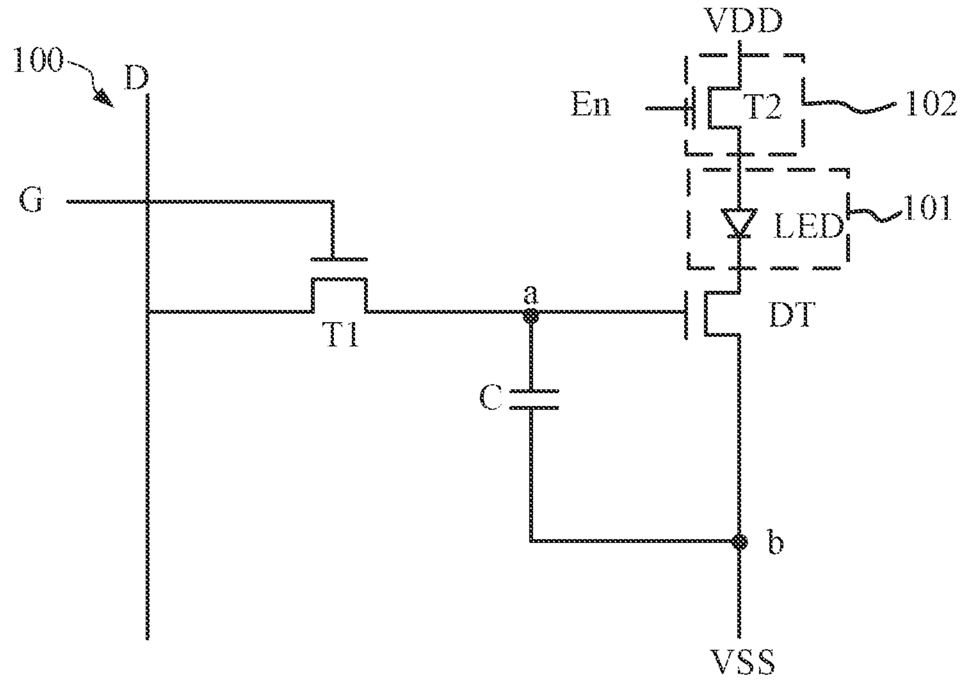
FIG. 2 is a schematic diagram of a first circuit of the backlight driving circuit provided by the present disclosure.

Please refer to FIG. 2. FIG. 2 is a schematic diagram of a first circuit of the backlight driving circuit provided by the present disclosure. As shown in conjunction with FIG. 1 and FIG. 2, the light emitting control module 102 comprises a light emitting control transistor T2, and the light emitting device 101 is a light emitting diode LED. A source of the light emitting control transistor T2 is connected to the first power signal VDD. A drain of the light emitting control transistor T2 is electrically connected to an anode of the light emitting diode LED. A gate of the light emitting control transistor T2 is connected to the enable signal En. A cathode of the light emitting diode LED is electrically connected to the source of the driving transistor DT. The drain of the driving transistor DT is electrically connected to the second power signal VSS. Apparently, it is understandable that the light emitting control module 102 may also be formed by a plurality of transistors connected in series, and the light emitting device 101 may also be a mini-LED or a micro-LED.

In the present disclosure, the backlight driving circuit 100 with a 2T1C (two transistors and a storage capacitor) structure is adopted to drive the light emitting diode LED to emit light, which uses fewer elements, has a simple and stable structure, and saves costs. In addition, in the present disclosure, it is only need to add a transistor to control the on and off of the light emitting loop, and while achieving the BFI, the circuit design is optimized and the circuit structure is simplified.

Figure 3:
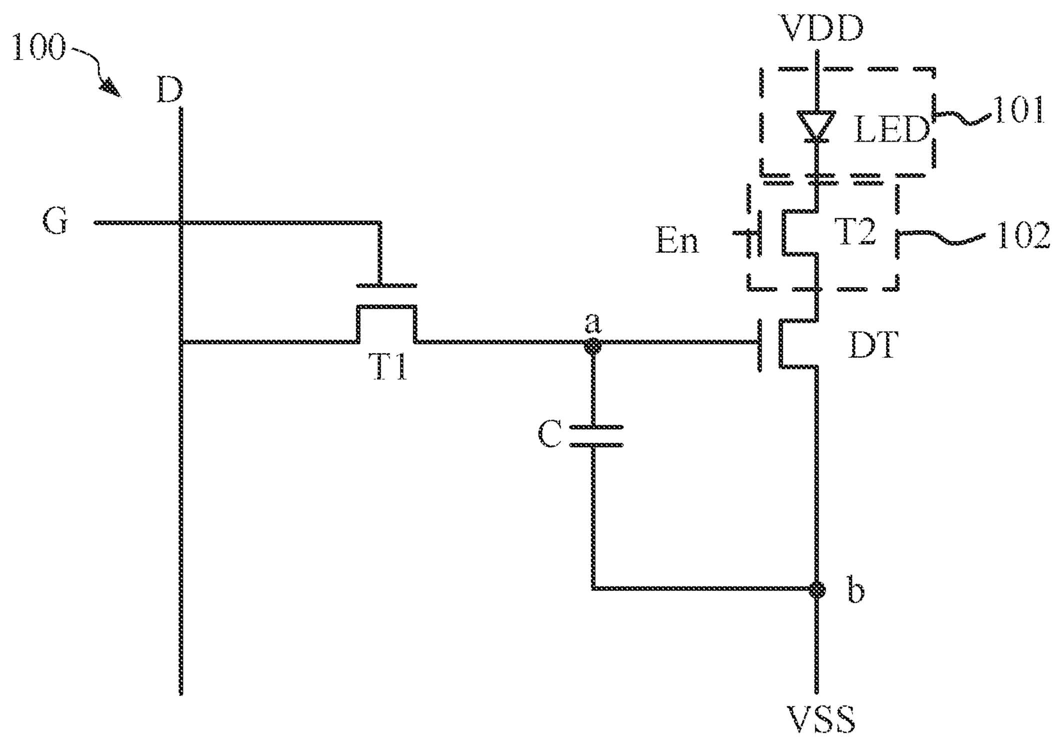
FIG. 3 is a schematic diagram of a second circuit of the backlight driving circuit provided by the present disclosure.

Please refer to FIG. 3. FIG. 3 is a schematic diagram of a second circuit of the backlight driving circuit provided by the present disclosure. As shown in conjunction with FIG. 1 and FIG. 3, the light emitting control module 102 comprises the light emitting control transistor T2, and the light emitting device 101 is a light emitting diode LED. The source of the light emitting control transistor T2 is electrically connected to the cathode of the light emitting diode LED. The drain of the light emitting control transistor T2 is electrically connected to the source of the driving transistor DT, and the drain of the driving transistor DT is electrically connected to the second power signal VSS. The gate of the light-emitting control transistor T2 is connected to the enable signal En. The anode of the light emitting diode LED is connected to the first power signal VDD. Apparently, it is understandable that the light emitting control module 102 may also be formed by a plurality of transistors connected in series, and the light emitting device 101 may also be a mini-LED or a micro-LED.

Figure 4:
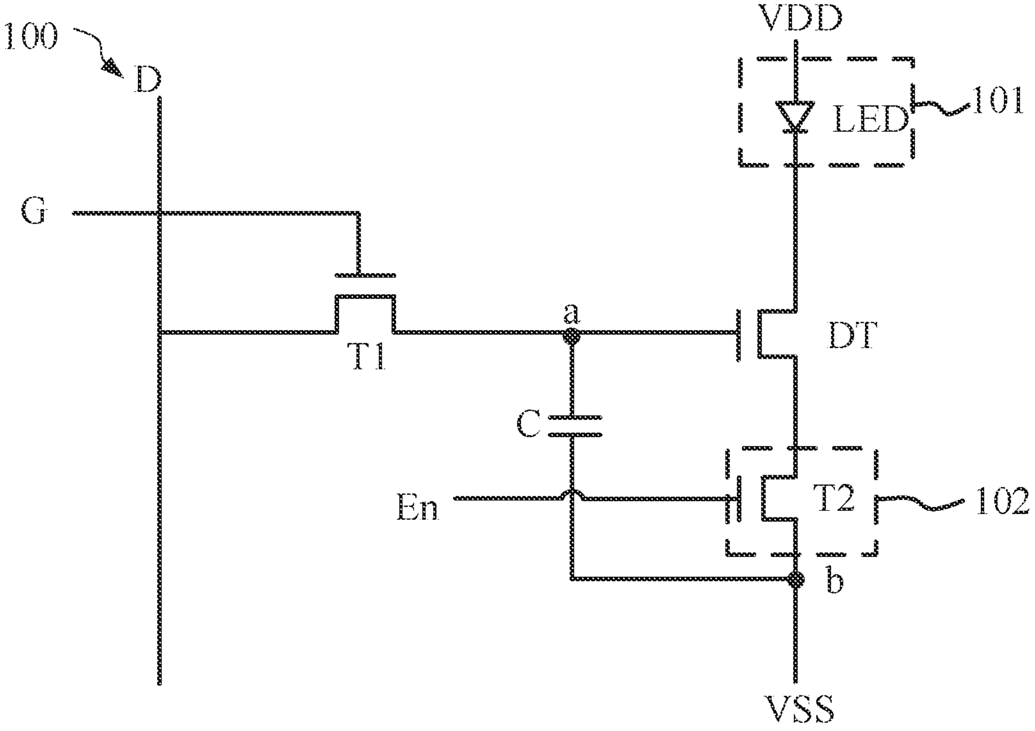
FIG. 4 is a schematic diagram of a third circuit of the backlight driving circuit provided by the present disclosure.

Please refer to FIG. 4. FIG. 4 is a schematic diagram of a third circuit of the backlight driving circuit provided by the present disclosure. As shown in conjunction with FIG. 1 and FIG. 4, the light emitting control module 102 comprises the light emitting control transistor T2. The light emitting device 101 is a light emitting diode LED. The source of the light emitting control transistor T2 is electrically connected to the source of the driving transistor DT. The drain of the light emitting control transistor T2 is electrically connected to a second node b, and the gate of the light emitting control transistor T2 is connected to the enable signal En. The anode of the light emitting diode LED is connected to the first power signal VDD, and the cathode of the light emitting diode LED is electrically connected to the drain of the driving transistor DT. Apparently, it is understandable that the light emitting control module 102 may also be formed by a plurality of transistors connected in series, and the light emitting device 101 may also be a mini-LED or a micro-LED.

The above embodiments are only examples of positions of the light emitting control module 102 provided in the present disclosure. In fact, the light emitting control module 102 of the present disclosure is configured to control the on and off of the light emitting device 101, and thus it only needs to be connected in series in the light emitting loop. The above schematic diagrams of the driving circuits are not limitations of the present disclosure.

In some embodiments, both the first power signal VDD and the second power signal VSS are configured to output a predetermined voltage value. In addition, in the present disclosure, a potential of the first power signal VDD is greater than a potential of the second power signal VSS. Specifically, the potential of the second power signal VSS may be a potential of a ground terminal. Apparently, it is understandable that the potential of the second power signal may also be other low voltage signals.

In some embodiments, the data signal writing transistor T1, the light emitting control transistor T2, and the driving transistor DT are all low temperature polysilicon thin film transistors, oxide semiconductor thin film transistors, or amorphous silicon thin film transistors. Transistors in the backlight driving circuit 100 provided in the present disclosure are all a same type of transistors, so as to prevent influence of difference between different types of transistors on the backlight driving circuit 100.

Figure 5:
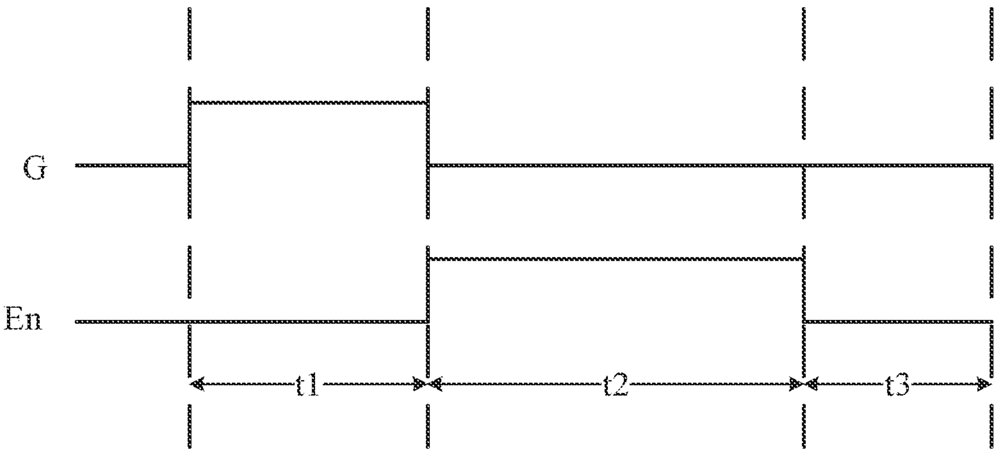
FIG. 5 is a timing diagram of the backlight driving circuit provided by the present disclosure.

Please refer to FIG. 1 and FIG. 5. FIG. 5 is a timing diagram of the backlight driving circuit provided by the present disclosure. As shown in conjunction with FIG. 1 and FIG. 5, a combination of the scan signal G and the enable signal En corresponds to a scan period t1, a display period t2, and a black insertion period t3.

Figure 6:
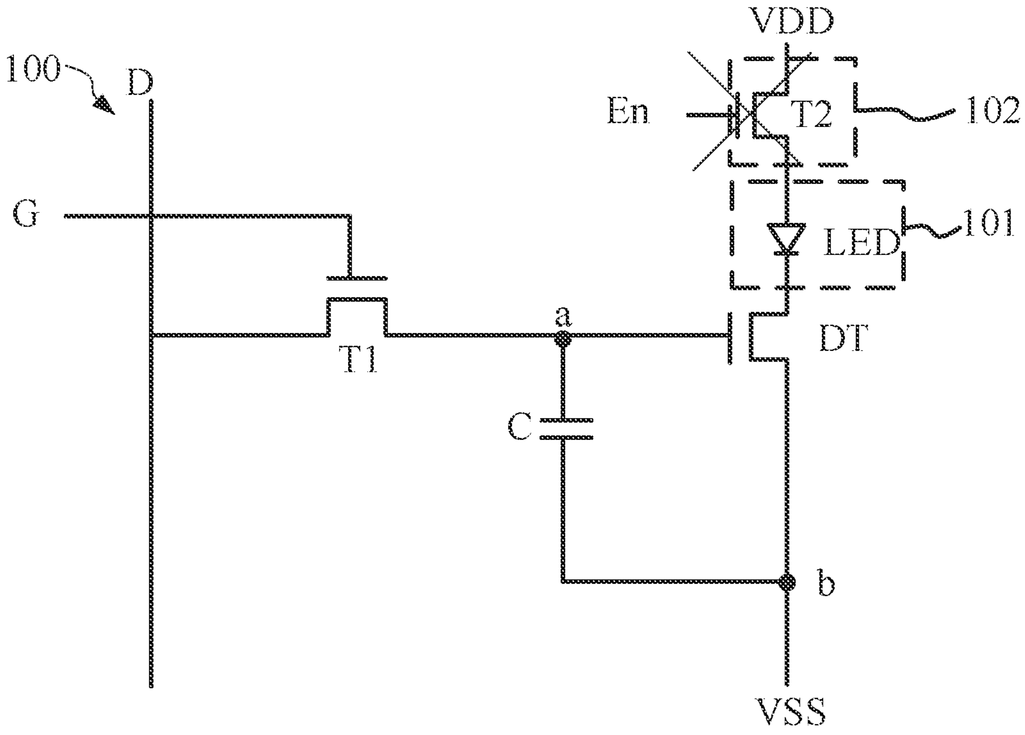
FIG. 6 is a schematic diagram of a path of the backlight driving circuit provided by the present disclosure during a scan period t1 in a driving timing shown in FIG. 5.

In some embodiments, during the scan period t1, the scan signal G is at a high level, and the enable signal En is at a low level. Specifically, please refer to FIG. 5 and FIG. 6 at the same time. FIG. 6 is a schematic diagram of a path of the backlight driving circuit 100 provided by the present disclosure during the scan period t1 in the driving timing shown in FIG. 5. Wherein, during the scan period t1, the scan signal G is at a high level, the data signal writing transistor T1 is turned on at this time, the data signal D is transmitted to the first node a, and the storage capacitor C is charged. At this time, a potential of the first node a is pulled up to a high potential, a gate-source voltage Vgs of the driving transistor DT is greater than a threshold voltage Vth, and the driving transistor DT is turned on. However, since the enable signal En is at a low level, the light emitting control transistor T2 is turned off, and the light emitting loop is cutoff. Therefore, the light emitting diode LED does not emit light at this time.

The gate-source voltage Vgs of the driving transistor DT refers to a potential difference between the first node a and the second node b, i.e., a voltage difference between the gate of the driving transistor DT and the source of the driving transistor DT.

Figure 7:
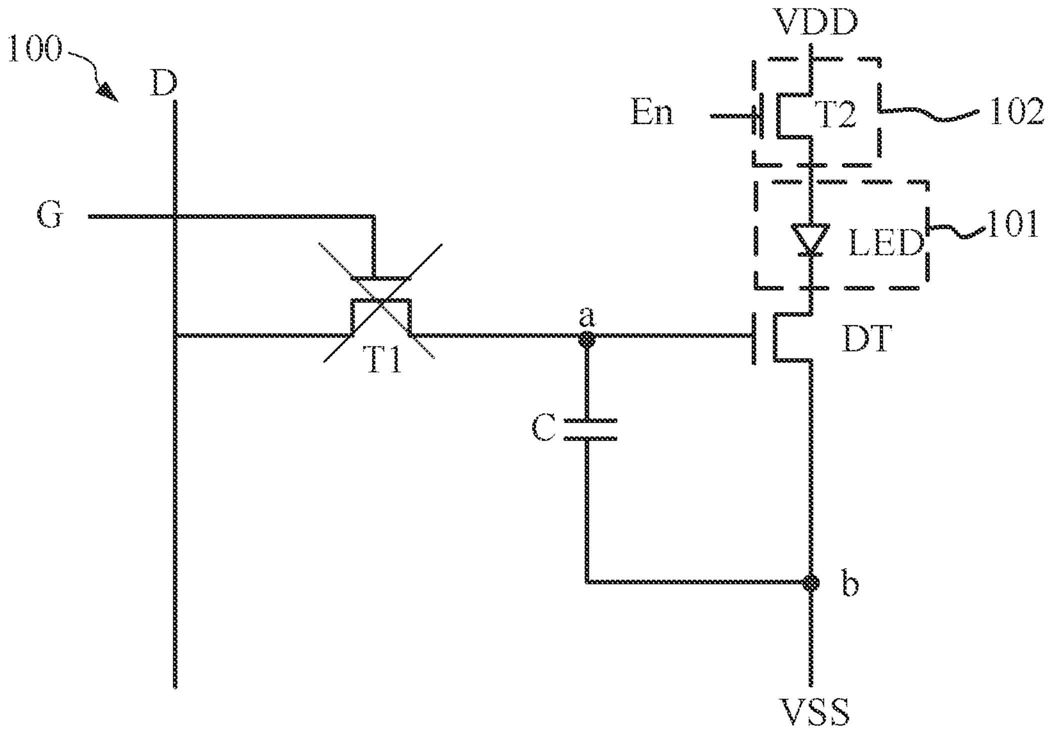
FIG. 7 is a schematic diagram of a path of the backlight driving circuit provided by the present disclosure during a display period t2 in the driving timing shown in FIG. 5.

In some embodiments, during the display period t2, the scan signal G is at a low level, and the enable signal En is at a high level. Specifically, please refer to FIG. 5 and FIG. 7 at the same time. FIG. 7 is a schematic diagram of a path of the backlight driving circuit provided by the present disclosure during the display period t2 in the driving timing shown in FIG. 5. Wherein, during the display period t2, the scan signal G is at a low level, the data signal writing transistor T1 is turned off at this time, and the scan charging has been completed. The potential of the first node a is maintained at a high level, the gate-source voltage difference Vgs of the driving transistor DT is greater than the threshold voltage Vth, and the driving transistor DT is turned on. At this time, the enable signal En is at a high level, the light emitting control transistor T2 is turned on, and the light emitting loop is on. The light emitting diode LED is powered by the first power signal VDD, the current is transmitted to the cathode of the light emitting diode LED through the anode of the light emitting diode LED, and the light emitting diode LED emits light.

Figure 8:
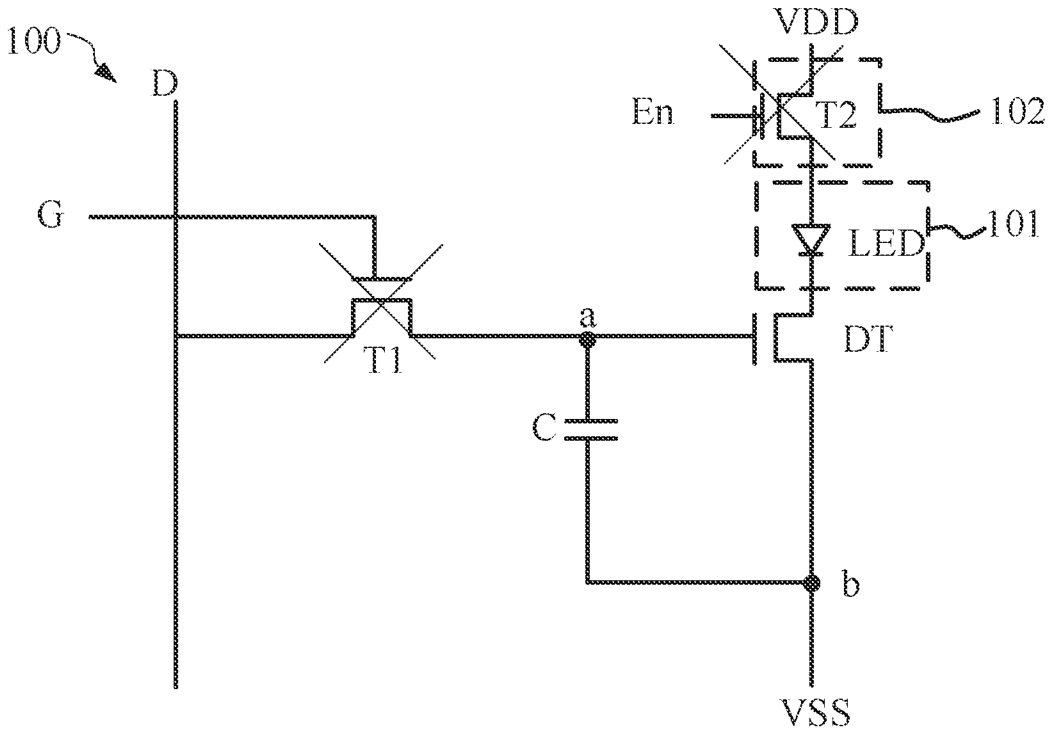
FIG. 8 is a schematic diagram of a path of the backlight driving circuit provided by the present disclosure during a black insertion period t3 in the driving timing shown in FIG. 5.

In some embodiments, during the black insertion period t3, the scan signal G is at a low level, and the enable signal En is at a low level. Specifically, please refer to FIGS. 5 and 8 at the same time. FIG. 8 is a schematic diagram of a path of backlight driving circuit provided by the present disclosure during the black insertion period t3 in the driving timing shown in FIG. 5. Wherein, during the black insertion period t3, the scan signal G is at a low level, the data signal writing transistor T1 is turned off, the enable signal En is at a low level, the light emitting control transistor T2 is turned off, the light emitting loop is off, and the light emitting diode LED stops emitting light.

It should be noted that during the scan period t1 and the black insertion period t3, the light emitting loop is cutoff, and the light emitting diode LED does not emit light. That is, the scan period t1 and the black insertion period t3 consist of a black frame insertion of the backlight.

It should be noted that in the present disclosure, the time of one scan period t1, one display period t2 and one black insertion period t3 constitutes a frame, and the black insertion period t3 may in a vertical blanking period, but this is not a limitation of the present disclosure.

Figure 9:
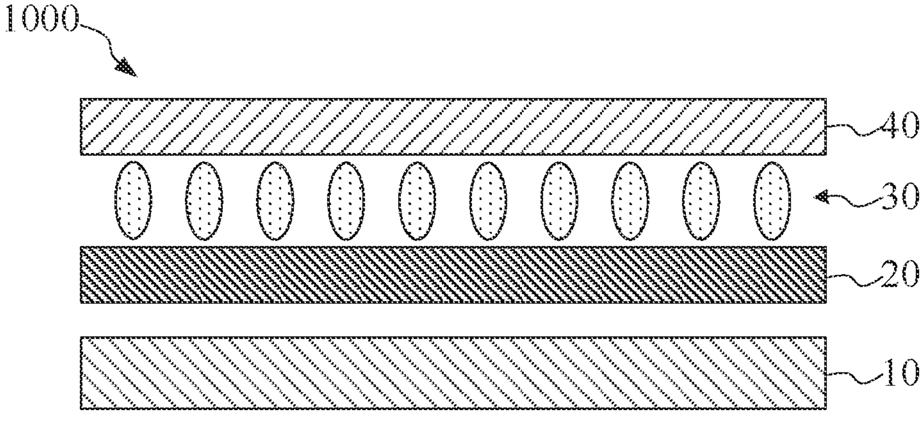
FIG. 9 is a schematic structural diagram of a liquid crystal display device provided by the present disclosure.

The present disclosure provides a liquid crystal display device. Please refer to FIG. 9. FIG. 9 is a schematic structural diagram of a liquid crystal display device provided by the present disclosure. The liquid crystal display device 1000 comprises a backlight module 10, an array substrate 20, a color film substrate 40, and a liquid crystal layer 30 disposed between the array substrate 20 and the color film substrate 40. The backlight module 10 is disposed at a side of the array substrate 20 away from the liquid crystal layer 30. The backlight module 10 is provided with the backlight driving circuit described in the above embodiments, and the backlight driving circuit is not shown in the figure. Wherein, the liquid crystal display device 1000 may also comprise pixel electrodes, common electrodes, or other devices. Specific arrangements and assembly of the liquid crystal display device 1000 are technical means well known to those skilled in the art, and will not be repeated here.

The liquid crystal display device 1000 provided by the present disclosure adopts the backlight driving circuit comprising the light emitting control module, which is configured to control the light emitting loop to be on or off under the control of the enable signal, thereby controlling the light emitting device to turn on or off. The liquid crystal display device provided by the present disclosure adopts the backlight driving circuit, which can realize the insertion of the black frame during the display process, decrease the trailing phenomenon, improve the product quality, and realize the BFI technology.

Figure 10:
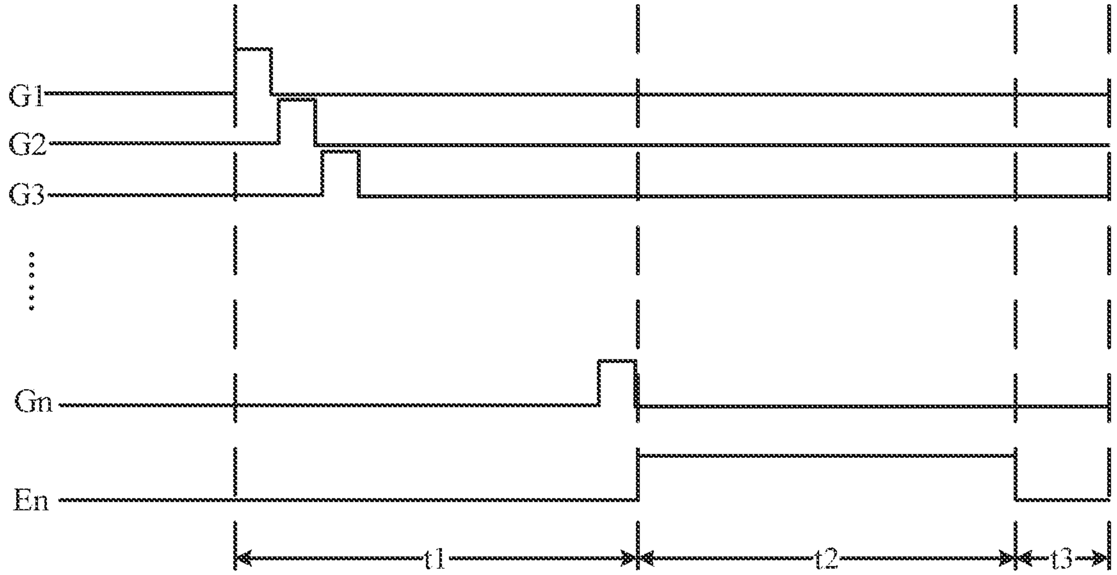
FIG. 10 is a timing diagram of a driving circuit of a backlight module provided by the present disclosure.

Please refer to FIG. 10 at the same time. FIG. 10 is a timing diagram of a driving circuit of the backlight module provided by the present disclosure. The following description will be made with reference to FIG. 9 and FIG. 10. In some embodiments, the driving timing of the backlight driving circuit comprises the scan period t1, the display period t2, and the black insertion period t3. During the scan period t1, under the driving of the pixel electrode and the common electrode, liquid crystals in the liquid crystal layer 30 are deflected line by line, and the backlight driving circuit performs scanning charging line-by-line under the control of the scan signal. Specifically, the backlight module 10 of the liquid crystal display device 1000 comprises n rows of backlight units, and each row of backlight units is charged under the driving of a corresponding backlight driving circuit, but does not turn on. Wherein, G1, G2, G3 . . . Gn represent scan signals corresponding to n rows of the backlight units respectively. During the display period t2, the deflection of the liquid crystal layer 30 is stable, and the backlight driving circuit drives the backlight module 10 to emit light, so that the liquid crystal display device 1000 displays. During the black insertion period t3, the backlight driving circuit turns off the n rows of backlight units at the same time, and the liquid crystal display device does not display at this time.

Specifically, in some embodiments, during the scan period t1, the scan signal G is at a high level, and the enable signal En is at a low level. Specifically, please refer to FIG. 5, FIG. 6, FIG. 9 and FIG. 10 at the same time. During the scan period t1, the liquid crystal layer 30 is deflected line by line under the control of the pixel electrode and the common electrode until a voltage between the pixel electrode and the common electrode reaches a predetermined value, and the deflection of the liquid crystals in the liquid crystal layer 30 is stable. At the same time, the scan signals G1, G2, G3 . . . Gn sequentially change from a low level to a high level, and the backlight driving circuit controls the backlight units in the backlight module 10 to charge line by line under the control of corresponding scan signals, but do not emit light.

This embodiment takes the backlight driving circuit of the first row of backlight units as an example for description. When G1 is at a high level, the data signal writing transistor T1 corresponding to the first row of backlight units is turned on, and the data signal D is transmitted to the first node a and charge the storage capacitor C. At this time, the potential of the first node a is pulled up to a high potential, the gate-source voltage Vgs of the driving transistor DT is greater than the threshold voltage Vth, and the driving transistor DT is turned on. However, since the enable signal En is at a low level, the light emitting control transistor T2 is turned off, and the light emitting loop is cutoff. Therefore, the first row of backlight units does not emit light at this time.

It should be noted that working principles of the backlight units in other rows during the scan period are the same, and will not be repeated here. Therefore, during the scan period t1, the liquid crystal display device 1000 does not display images.

Wherein, the gate-source voltage Vgs of the driving transistor DT refers to the potential difference between the first node a and the second node b, i.e., the voltage difference between the gate of the driving transistor DT and the source of the driving transistor DT.

Specifically, in some embodiments, during the display period t2, the scan signals G1, G2, G3 . . . Gn are all maintained at low levels, and the enable signal En is at a high level. Specifically, please refer to FIG. 5, FIG. 7, FIG. 9 and FIG. 10 at the same time. During the display period t2, the deflection of the liquid crystal layer 30 is completed and the state is stable. At this time, the scan signals G1, G2, G3 . . . Gn are all at low levels, the data signal writing transistor T1 of the backlight driving circuit in each row of the backlight units is turned off, and the scan charging has been completed. The potential of the first node a is maintained at a high level, the gate-source voltage difference Vgs of the driving transistor DT is greater than the threshold voltage Vth, and the driving transistor DT is turned on. At this time, the enable signal En of the backlight drive circuit in each row of the backlight units is at a high level, the light emitting control transistor T2 is turned on, the light emitting loop is turned on, the current is transmitted through the anode of the light emitting diode LED to the cathode of the light emitting diode LED, and the light emitting diode LED emits light. Then the backlight module 10 is lit, and the liquid crystal display device 1000 displays images.

In some embodiments, during the black insertion period t3, the scan signals G1, G2, G3 . . . Gn are at low levels, and the enable signal En is at a low level. Specifically, please refer to FIG. 5, FIG. 8, FIG. 9 and FIG. 10 at the same time. During the black insertion period t3, the scan signals G1, G2, G3 . . . Gn still remain at low levels, the data signal writing transistor T1 is turned off, the enable signal En is at a low level, the light emitting control transistor T2 is turned off, and the light emitting loop is cutoff. The first power signal VDD no longer supplies power to the light emitting diode LED, and the light emitting diode LED stops emitting light.

In the present disclosure, the black insertion period t3 is added, which can release charges of the storage capacitor C in the backlight driving circuit and achieve an effect of circuit reset. On the one hand, the backlight can be completely turned off during the black insertion period t3 to prevent the backlight from being not completely turned off during the scan period t1 of a next frame, which will leave an afterimage when the liquid crystals are deflected, resulting in poor display effects. On the other hand, the circuit can be reset to a potential to make the scanning and charging of the next frame more accurate, without being affected by residual charges, thereby prevent affecting a brightness of the backlight.

The liquid crystal display device 1000 of the present disclosure cyclically reciprocates the scan period, the display period, and the black insertion period, and finally realizes the function of displaying the black insertion frame by frame of the liquid crystal display device 1000, satisfies the BFI function requirement, and improves the product quality. In addition, the liquid crystal display device 1000 of the present disclosure performs backlight display after the deflection of the liquid crystal layer 30 is stabilized, and does not light up the backlight when the deflections of the liquid crystals have not reached a steady state. Therefore, the problem of trailing when displaying images can also be decreased.

The liquid crystal display device 1000 of the present disclosure may be applied to an active matrix LED backlight liquid crystal display, an active matrix mini LED backlight liquid crystal display, or an active matrix micro LED backlight liquid crystal display. The liquid crystal display device 1000 may be an electronic device with a display function such as a mobile phone, a tablet computer, a notebook, a game console, a digital camera, a car navigation system, an electronic billboard, an automatic teller machine, and the like.

The above provides a detailed introduction to a backlight driving circuit and a liquid crystal display device provided by the present disclosure. Specific examples are used to illustrate principles and implementations of the present disclosure. The description of the above embodiments is only used to help understand the methods and the core ideas of the present disclosure. At the same time, for those skilled in the art, according to the idea of the present disclosure, there will be changes in the specific implementation and the scope of application. In summary, the content of this specification should not be construed as a limitation to the present disclosure.

What is claimed is:

1. A backlight driving circuit, for driving a backlight module, wherein the backlight driving circuit comprises:

a light emitting device connected in series to a light emitting loop formed by a first power signal and a second power signal;

a driving transistor, wherein a source and a drain of the driving transistor are connected in series to the light emitting loop, a gate of the driving transistor is electrically connected to a first node, and the driving transistor is configured to control a current flowing through the light emitting loop;

a data signal writing transistor, wherein a source of the data signal writing transistor is connected to a data signal, a drain of the data signal writing transistor is electrically connected to the first node, and a gate of the data signal writing transistor is connected to a scan signal;

a storage capacitor, wherein a first terminal of the storage capacitor is electrically connected to the first node, and a second terminal of the storage capacitor is connected to the second power signal; and a light emitting control module, wherein the light emitting control module is connected to an enable signal and connected in series to the light emitting loop, and the light emitting control module is configured to control the light emitting loop to be turned on or off based on the enable signal;

wherein a driving timing of the backlight driving circuit comprises a scan period, a display period, and a black insertion period; and during the scan period, the data signal writing transistor is turned on, and the light emitting the control module is turned off; during the black insertion period, the scan signal is at a low level, and the signal writing transistor is turned off; the enable signal is at a low level, the light emitting control module is turned off, and the backlight module is turned off; and the scan period and the black insertion period consist of a black frame insertion of a backlight.

2. The backlight driving circuit of claim 1, wherein the light emitting control module comprises a light emitting control transistor; and a source of the light emitting control transistor is connected to the first power signal, a drain of the light emitting control transistor is electrically connected to the light emitting device, and a gate of the light emitting control transistor is connected to the enable signal.

3. The backlight driving circuit of claim 2, wherein the data signal writing transistor, the light emitting control transistor, and the driving transistor are all low temperature polysilicon thin film transistors.

4. The backlight driving circuit of claim 2, wherein the data signal writing transistor, the light emitting control transistor, and the driving transistor are all oxide semiconductor thin film transistors.

5. The backlight driving circuit of claim 2, wherein the data signal writing transistor, the light emitting control transistor, and the driving transistor are all amorphous silicon thin film transistors.

6. The backlight driving circuit of claim 2, wherein the light emitting device is a light emitting diode, and the drain of the light emitting control transistor is electrically connected to an anode of the light emitting diode.

7. The backlight driving circuit of claim 1, wherein, during the scan period, the scan signal is at a high level, and the enable signal is at a low level.

8. The backlight driving circuit of claim 1, wherein, during the display period, the scan signal is at a low level, and the enable signal is at a high level.

9. A liquid crystal display device, wherein the liquid crystal display device comprises a backlight module, an array substrate, a color film substrate, and a liquid crystal layer disposed between the array substrate and the color film substrate, the backlight module is disposed at a side of the array substrate away from the liquid crystal layer and provided with a backlight driving circuit comprising:

a light emitting device connected in series to a light emitting loop formed by a first power signal and a second power signal;

a driving transistor, wherein a source and a drain of the driving transistor are connected in series to the light emitting loop, a gate of the driving transistor is electrically connected to a first node, and the driving transistor is configured to control a current flowing through the light emitting loop;

a data signal writing transistor, wherein a source of the data signal writing transistor is connected to a data signal, a drain of the data signal writing transistor is electrically connected to the first node, and a gate of the data signal writing transistor is connected to a scan signal;

a storage capacitor, wherein a first terminal of the storage capacitor is electrically connected to the first node, and a second terminal of the storage capacitor is connected to the second power signal; and a light emitting control module, wherein the light emitting control module is connected to an enable signal and connected in series to the light emitting loop, and the light emitting control module is configured to control the light emitting loop to be turned on or off based on the enable signal;

wherein a driving timing of the backlight driving circuit comprises a scan period, a display period, and a black insertion period; and during the scan period, the data signal writing transistor is turned on, and the light emitting the control module is turned off; during the black insertion period, the scan signal is at a low level, and the signal writing transistor is turned off; the enable signal is at a low level, the light emitting control module is turned off, and the backlight module is turned off; and the scan period and the black insertion period consist of a black frame insertion of a backlight.

10. The liquid crystal display device of claim 9, wherein during the scan period, liquid crystals in the liquid crystal layer are deflected line by line; during the display period, deflection of the liquid crystal layer is stable, the backlight driving circuit drives the backlight module to emit light, and the liquid crystal display device performs normal image display; and during the black insertion period, the backlight driving circuit controls the backlight module to turn off.

11. The liquid crystal display device of claim 10, wherein, during the scan period, the scan signal is at a high level, and the enable signal is at a low level.

12. The liquid crystal display device of claim 10, wherein, during the display period, the scan signal is at a low level, and the enable signal is at a high level.

13. The liquid crystal display device of claim 9, wherein the light emitting control module comprises a light emitting control transistor; and a source of the light emitting control transistor is connected to the first power signal, a drain of the light emitting control transistor is electrically connected to the light emitting device, and a gate of the light emitting control transistor is connected to the enable signal.

14. The liquid crystal display device of claim 13, wherein the light emitting device is a light emitting diode, and the drain of the light emitting control transistor is electrically connected to an anode of the light emitting diode.

15. The liquid crystal display device of claim 13, wherein the data signal writing transistor, the light emitting control transistor, and the driving transistor are all low temperature polysilicon thin film transistors.

16. The liquid crystal display device of claim 13, wherein the data signal writing transistor, the light emitting control transistor, and the driving transistor are all oxide semiconductor thin film transistors.

17. The liquid crystal display device of claim 13, wherein the data signal writing transistor, the light emitting control transistor, and the driving transistor are all amorphous silicon thin film transistors.

* * * * *